United States Patent
Lo et al.

(10) Patent No.: US 7,612,837 B2
(45) Date of Patent: Nov. 3, 2009

(54) PROTECTING STRUCTURE FOR ELECTROSTATIC DISCHARGE

(75) Inventors: Chang-Cheng Lo, Chia Yi Hsien (TW); Hong-Jye Hong, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 413 days.

(21) Appl. No.: 11/599,267

(22) Filed: Nov. 15, 2006

(65) Prior Publication Data
US 2007/0058098 A1    Mar. 15, 2007

Related U.S. Application Data

(62) Division of application No. 10/900,104, filed on Jul. 28, 2004, now Pat. No. 7,158,194.

(30) Foreign Application Priority Data
Oct. 9, 2003    (TW)    ................. 92128141 A

(51) Int. Cl.
G02F 1/1333    (2006.01)

(52) U.S. Cl. ................... 349/40; 349/54; 349/55

(58) Field of Classification Search ............ None
See application file for complete search history.

(56) References Cited

U.S. PATENT DOCUMENTS
2003/0112402 A1 *    6/2003    Nakajima et al. ......... 349/149
* cited by examiner Primary Examiner—David Nelms
Assistant Examiner—Lucy P Chien
(74) Attorney, Agent, or Firm—Thomas, Kayden, Horstemeyer & Risley

(57) ABSTRACT

A protecting structure for ESD is formed on a substrate of a TFT-LCD. A display area of the TFT-LCD is formed by a pixel array comprising lots of pixel units, scan lines and data lines. The protecting structure comprises a first rake metal and an α-Si layer. The first rake metal is formed outside the display area and each short end of the first rake metal faces the data line by a spacing. Further, all tips of the short end and the data lines are sharp in shape so as to accumulate electrostatic charges. The α-Si layer is formed directly under the predetermined short end of first rake metal and the corresponding data line. The α-Si layer is used to serve as a discharging path for performing through breakdown to the α-Si layer so as to eliminate electrostatic charges.

3 Claims, 4 Drawing Sheets

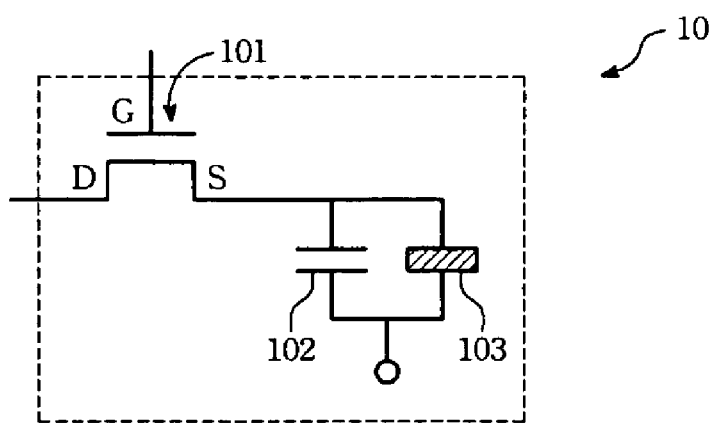
F I G . 2

US 7,612,837 B2

PROTECTING STRUCTURE FOR ELECTROSTATIC DISCHARGE

RELATED APPLICATIONS

This application is a Division of application U.S. Ser. No. 10/900,104, entitled "PROTECTING STRUCTURE FOR ELECTROSTATIC DISCHARGE" and filed on Jul. 28, 2004, now U.S. Pat. No. 7,158,194.

BACKGROUND OF THE INVENTION (1) Field of the Invention

The invention relates to a thin film transistor-liquid crystal display (TFT-LCD), and more particularly to a protecting structure for electrostatic discharge (ESD) in fabricating a flat panel of the TFT-LCD.

(2) Description of the Prior Art

During the process of fabricating a TFT-LCD, to prevent or to mitigate an ESD event is one of the most considerable problems. Otherwise, there usually accompanies a substantial drop in product yield. The ESD problems rise from a glass substrate of the TFT-LCD which is an insulating material (whose electric conductivity is about $10^{-14}$ S/cm) and has a pretty low electromagnetic decay rate. While in running a specific manufacturing process (e.g. dry etching) or while in conveying the substrate, many electrostatic charges can be accumulated around the surface of the substrate. Unless there exists a suitable discharging path on the substrate, or electrostatic charges may stay on the surface of the substrate. It is obvious that a bigger size of the TFT-LCD panel may accumulate a larger amount of the electrostatic charges. Therefore, to depart electrostatic charges from the substrate has become a major concern of the process of fabricating the TFT-LCD.

Referring to FIG. 1, a conventional ESD protecting structure along with a pixel array on the substrate is schematically shown. Also referring to FIG. 2, a schematic view of composition devices in a single pixel unit is shown. The pixel unit 10 includes a thin film transistor (TFT) 101, a capacitor 102 and a liquid crystal layer 103. In the pixel array, each gate (G) of the TFT 101 of the pixel unit 10 connects to a scan line 12. On the other hand, each drain (D) connects to a data line 16.

It should be noted that there exists two ESD protecting structures in FIG. 1. One is a first rake metal 14 formed aside the scan lines 12 (left-hand side in FIG. 1), and the other is a second rake metal 18 formed aside the data lines 16 (bottom side in FIG. 1). Both of the protecting structures are designed according to the same principal. For the second rake metal 18, an end point of each data line 16 is sharp in shape and each of which is facing, closely but not connecting, respective sharp tip of each short part 18a of the second rake metal 18. Upon such an arrangement, the sharp tip of the metal 18 can easily discharge the electrostatic charges on the glass substrate and thus problems that may be caused by the ESD can be better avoided.

Apparently, the foregoing protecting structure is used as an inactive way to achieve the ESD protection. Generally, the discharging effect between the data lines 16 and the corresponding rake metal 18 are hard to take place. Typically, a 7 kV is usually a minimum to initiate a discharging. Refer to FIG. 3 where a cross-sectional view of the area 19 in FIG. 1 is shown. As shown, the end point of data line 16 and the tip of short part 18a of the second rake metal 18 are all sharp in shape. These sharp structures can help to accumulate locally mass of electrostatic charges and then at some point to break down through the insulating layer 24 for performing the electrostatic discharge. It should be noted that ordinary materials for the insulating layer 24 can be $SiO_2$, $SiN_x$ or SiON. Among those materials, bad conductivity are their common property. Therefore, discharging phenomenon in between is hard to occur, and thus a bad performance in preventing the ESD problem can be inevitable.

Empirically, the ESD damage event mostly occurred around the edge of the pixel array. To take the foregoing conventional protecting structure for example, the edge area of the pixel array is still in the display area 20. As the ESD damage event occurred, several pixel units 10 around the edge or display area 20 can be damaged to directly affect image display of the panel. Hence, the present invention provides a novel protecting structure to resolve the aforesaid ESD problem.

SUMMARY OF THE INVENTION

Accordingly, it is one object of the present invention to provide a protecting structure for ESD.

It is another object of the present invention to provide a protecting structure that utilizes dummy pixel units, dummy data lines or dummy scan lines to prevent the image display from being affected by possible ESD.

It is one more object of the present invention to provide a protecting structure that utilizes breakdown discharging of the α-Si layer to lessen the ESD problem.

It is one more object of the present invention to provide a protecting structure that introduces discharging capacitors to raise efficiency in preventing the ESD.

In one aspect of the invention, the protecting structure is formed on a substrate of a TFT-LCD. A display area of the TFT-LCD is formed as a pixel array comprising a plurality of pixel units, a plurality of scan lines, and a plurality of data lines. Each gate of TFTs of the pixel units is electrically connected to a corresponding raw of scan lines, each drain of the TFTs of the pixel units is electrically connected to the corresponding column of data lines.

Typically, the protecting structure comprises a plurality of the dummy pixel units, a first rake metal and an α-Si layer. Each gate of the TFTs of the dummy pixel units connects to a corresponding row of the scan lines, while each drain of the TFTs of the dummy pixel units connected to a corresponding column of the data lines. Both of the gates and the drains are used to serve as an inducing discharging area. The first rake metal is formed outside of the display area. Each short end of the first rake metal is aligned with data line, and a tip of each short end of the first rake metal and another tip of the corresponding data line are both sharp in shape so as to accumulate electrostatic charges. The α-Si layer is formed directly under the data line connecting the dummy pixel unit and the corresponding short end of first rake metal. Further, the α-Si layer served as a discharging path through breakdown of the α-Si layer to eliminate electrostatic charges from the tip of short end of first rake metal and the tip of the corresponding data line.

In another aspect of the invention, the protecting structure comprises a dummy data line, a first rake metal and an α-Si layer. The dummy data line formed outside a display area and paralleled to the outsidemost data line is used for inducing the discharging area. The first rake metal is also formed outside the display area. Additionally, each short end of the first rake metal is located opposite to the data line and the dummy data line. Tips of the short end of first rake metal, the data lines and the dummy data line are all sharp in shape so as to gather electrostatic charges. The α-Si layer is formed directly under the dummy data line and the corresponding short end of first rake metal for serving as a discharging path. Through breakdown of the α-Si layer, the electrostatic charges can be removed or eliminated from the tip of the dummy data line and the tip of corresponding short end of first rake metal.

BRIEF DESCRIPTION OF THE DRAWINGS

The present invention will now be specified with reference to its preferred embodiment illustrated in the drawings, in which

FIG. 2 is a schematic view of a typical single pixel unit;

DESCRIPTION OF THE PREFERRED EMBODIMENT

The invention disclosed herein is to provide a protecting structure for ESD event in a TFT-LCD. In the present invention, dummy pixel units, dummy data lines, or dummy scan lines are used to induce electrostatic discharging. By providing a metal tip to accumulate mass electrostatic charges and an α-Si layer to breakdown discharging effect, electrostatic charges existing on the substrate of the TFT-LCD can be better eliminated. Furthermore, a discharging capacitor is added to gather electrostatic charges and an insulating layer can be used as a discharging path. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

First Embodiment

Figure 1:
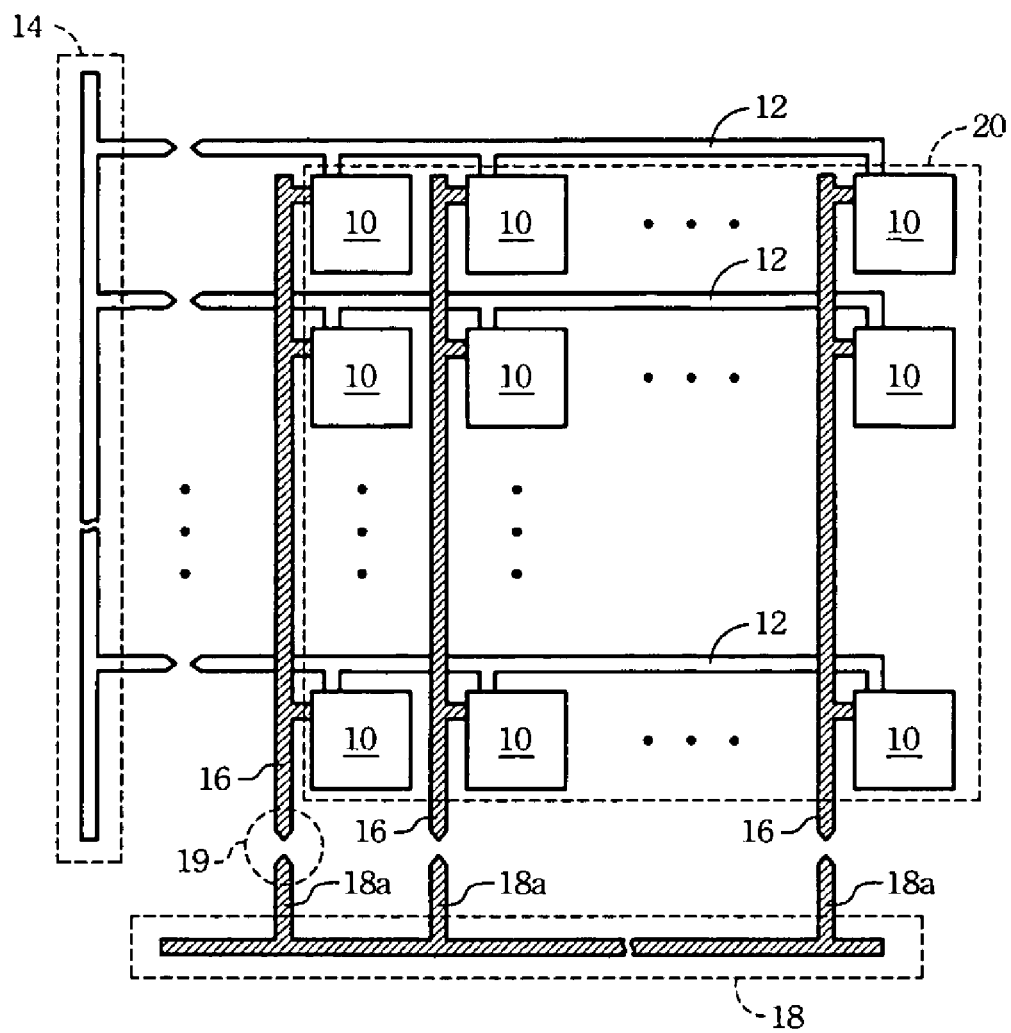
FIG. 1 is a schematic view of a conventional ESD protecting structure manufacturing along with a pixel array on the substrate.
Figure 3:
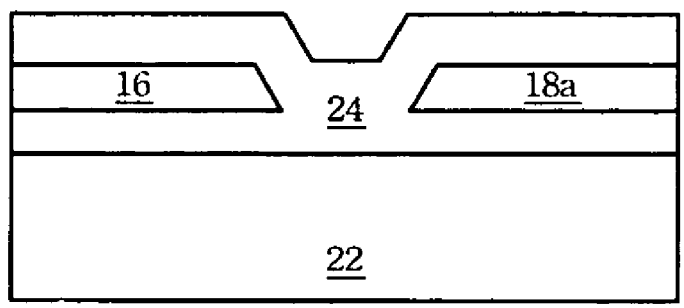
FIG. 3 is a cross-sectional view of area 19 of FIG. 1.
Figure 4:
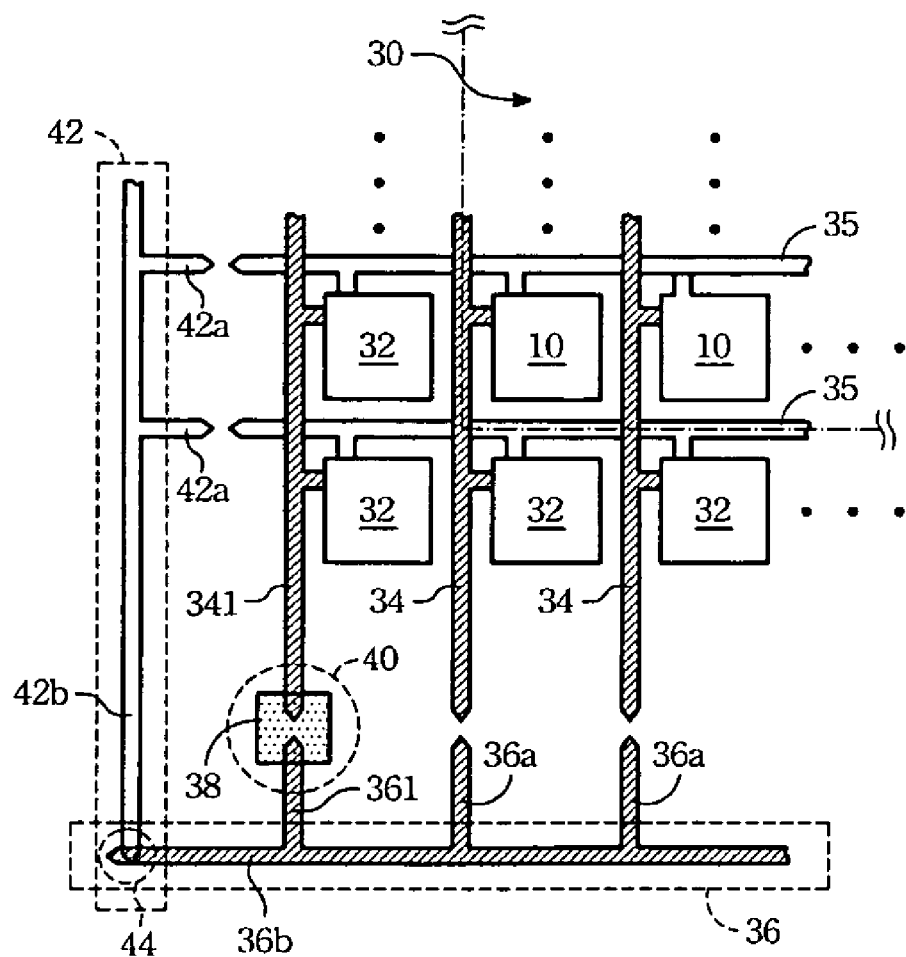
FIG. 4 is a schematic view showing partial of the pixel array of a first embodiment of the invention.

FIG. 4 illustrates partial protecting structure for ESD according to a first embodiment of the present invention. In the embodiment, there has three major structures for ESD protection. One is a dummy pixel unit 32, one is an α-Si layer serving as the breakdown discharging path, and the other is the discharging capacitor of the area 44.

The dummy pixel units 32 are formed on the surrounding area outside a display area 30. Each gate of the TFT of the dummy pixel units 32 (details of a single dummy pixel unit 32 known as FIG. 2) connects the corresponding row of a scan line 35 and each drain connects the corresponding column of a data line 34 or 341. The dummy pixel units 32 are used to induce electrostatic discharging. Due to a long-term observation, the ESD damage event mostly occurred around the edge of the pixel array. Accordingly, by using the same manufacturing process to form the dummy pixel units 32 outside the display area 30 of the pixel array, the ESD damage event can be prevented from taking place among the display area 30 so that the quality of image display can be ensured. Similarly, based on the same design idea to form the dummy data lines 32, the dummy scan lines illustrated in the following embodiment can be easily organized.

In the present embodiment, utilizing an α-Si layer as the discharging path for ESD protection is introduced. As shown in FIG. 4, a first rake metal 36 outside the display area 30 is formed aside the data lines 34 and a data line 341. Each short end 36a of the first rake metal 36 and the short end 361 of the first rake metal 36 are located to face each data line 34 and the data line 341, respectively. Furthermore, all tips of the short end of first rake metal 36 and the data lines 34 and 341 are all sharp in shape so as to help in accumulating electrostatic charges. It should be noted that, in the area 40 locating the short end 361 of the first rake metal 36 and the tip of the data line 341, an α-Si layer 38 is used to bridge in between and to serve as a discharging path. Through breakdown of the α-Si layer 38, the substrate of the TFT-LCD can eliminate electrostatic charges from the tip of the short end 361 of the first rake metal 36 and the tip of the corresponding data line 341.

Figure 5:
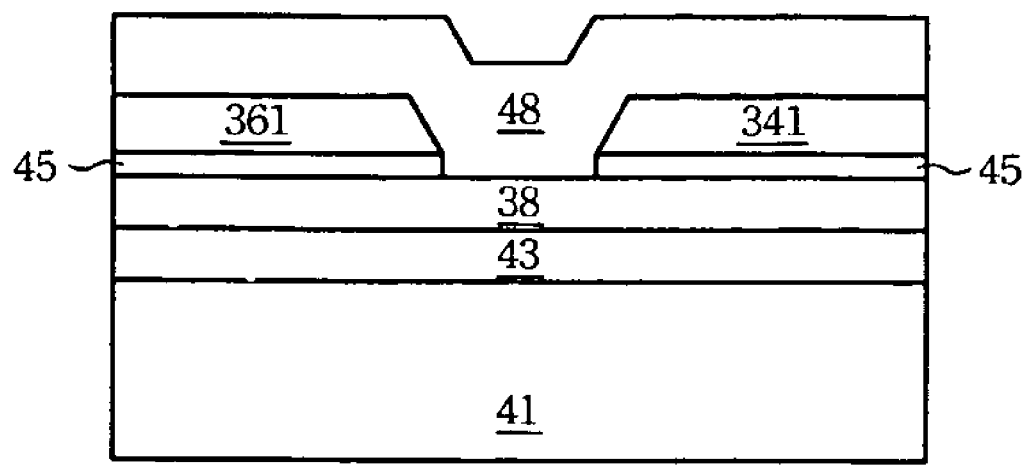
FIG. 5 is a cross-sectional view of area 40 of FIG. 4.

FIG. 5 shows a cross-sectional view of area 40 of FIG. 4. The structure of area 40 includes a substrate 41, an insulating layer 43, an α-Si layer 38, an n+ α-Si layer 45, the data line 341, the short end 361 of the first rake metal 36, and a passivation layer 48. For the data line 341 and the short end 361 of the first rake metal 36 are formed simultaneously with the metal layer in the manufacturing process, so term "the first metal layer" is used to include all. As shown, the first metal layer has an aperture to expose the α-Si layer 38. The n+ α-Si layer 45 located between the first metal layer (also known as the short end 361 of the first rake metal 36 and the data line 341) and the α-Si layer 38 so as to lower the schottky barrier between the first metal layer and the α-Si layer 38.

When the foregoing protecting structures are done, the accumulating electrostatic charges occurred on the tip of the short end 361 of the first rake metal 36 and the tip of the data line 341 can be discharged through breakdown of the α-Si layer 38 and thus achieve expected prevention upon the ESD problem.

On the other hand, the discharging capacitor according to the invention is also formed outside the display area 30. One part of the discharging capacitor is formed by a second rake metal 42 forming aside the scan line 35. Each short end 42a of the second rake metal 42 faces, by a predetermined spacing, the scan line 35 individually. Furthermore, the tip of each short end 42a and the tip of the scan lines 35 are all sharp in shape so as to gather electrostatic charges. The other part to composite the discharging capacitor is the long end 36b of above-mentioned first rake metal 36. The tip of long end 42b and the tip of the long end 36b of the first rake metal 36 are also sharp in shape so as to gather electrostatic charges.

Figure 6:
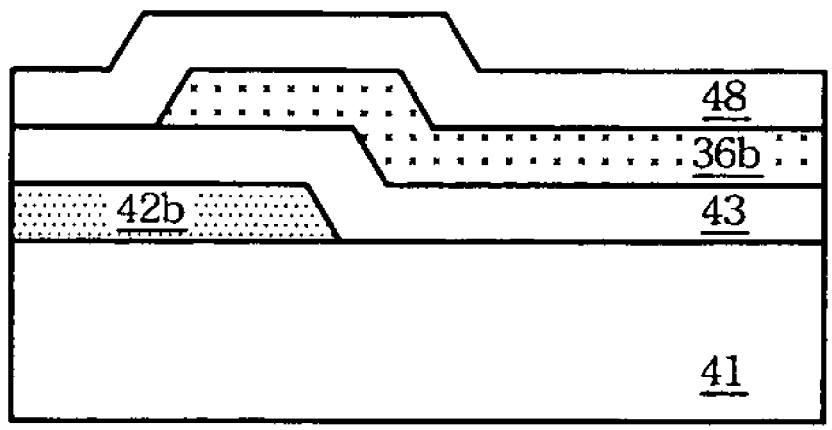
FIG. 6 is a cross-sectional view of area 44 of FIG. 4.

Referring now to FIG. 6, a cross-sectional view of area 44 of FIG. 4 is shown. An insulating layer 43 is located between a metal 42b and another metal 36b, and each of the metal 42b or 36b can gather a substantial amount of electrostatic charges. Upon such an arrangement, a discharging capacitor is formed by the metal 36b, the insulating layer 43 and the metal 42b. As the electrostatic charges accumulated in the capacitor cause breakdown of the insulating layer 43, the electrostatic charges are then discharged and thus the ESD problem can be avoided.

Second Embodiment

Figure 7:
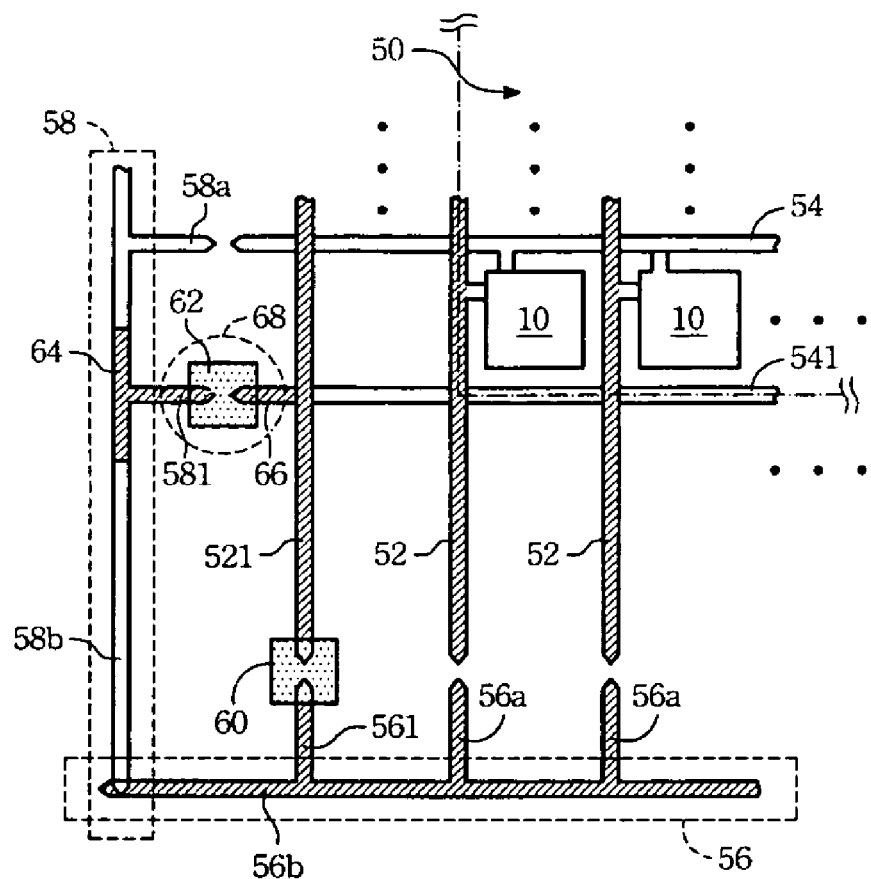
FIG. 7 is a schematic view showing partial of the pixel array of a second embodiment of the invention.

Referring to FIG. 7, a second embodiment of the invention is illustrated. As shown, a dummy data line 521 is formed outside the display area 50 and paralleled to the data line 52. The distance between the dummy data line 521 and the data line 52 is the same as that between two neighboring data lines 52, which is spaced enough to construct a pixel unit 10. The dummy data line 521 is used for inducing electrostatic discharging. Similar to the first embodiment, a first rake metal 56 and a second rake metal 58 are formed around the edge of the display area 50, and also prevention of the ESD problem is achieved through breakdown of an α-Si layer 60ve. Additionally, a discharging capacitor is also formed by the long end 56b of the first rake metal 56 and the long end 58b of the second rake metal 58 to enforce the prevention upon the ESD.

In the embodiment of FIG. 7, the effect of adding the dummy scan line 541 is to form an additional α-Si layer 62 to provide a further discharging path for the tip of the dummy scan line 541 and the short end 581 of the second rake metal 58. It should be noted that the positions of the dummy scan line 541 and the short end 581 of the second rake metal 58 are different from those of the dummy data line 521 and the short end 561 of the first rake metal 56. Hence, another metal layer (also part of the first metal layer) is formed over the dummy scan line 541 and the short end 581 of the second rake metal 58 (both of them belongs to the second metal layer).

Figure 8:
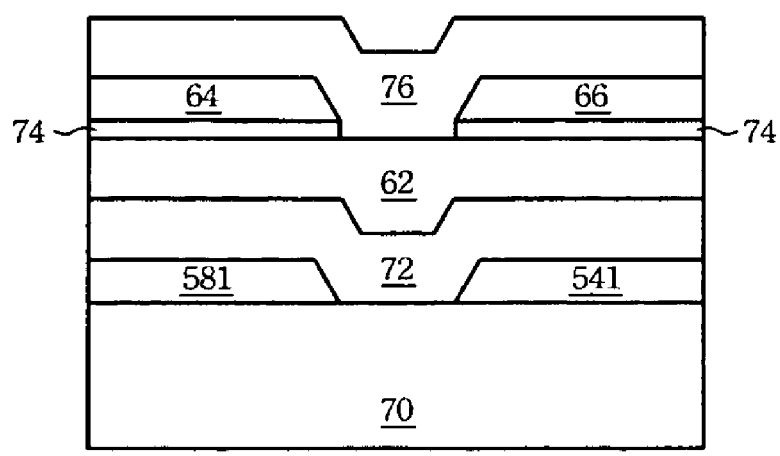
FIG. 8 is a cross-sectional view of area 68 of FIG. 7.

Referring now to FIG. 8, a cross-sectional view of area 68 of FIG. 7 is shown. The dummy scan line 541 and the short end 581 of the second rake metal 58 are both formed on a substrate 70 and both of them locate at the same metal layer (also known as the second metal layer). Besides, the second metal layer has an aperture to expose the substrate 70. Then, the insulating layer 72 and the α-Si layer 62 can be deposited sequentially. Afterwards, the first metal layer is formed on the α-Si layer 62 by having an aperture to expose the α-Si layer 62. As shown, the first metal layer is separated into two parts; one is a metal layer 64, and the other is another metal layer 66. Finally, a passivation layer 76 is formed upmost the stack.

Additionally, an n+ α-Si layer 74 is located between the metal layer 64, 66 and the α-Si layer 62 for lowering the schottky barrier between the metal layers 64, 66 and the α-Si layer 62. As shown, one capacitor is formed by the metal layer 64 and the short end 581 of the second rake metal 58, and another capacitor is formed by the metal layer 66 and the dummy scan line 541. Both the capacitor structures can gather a substantial amount of electrostatic charges among the substrate 70. Furthermore, the α-Si layer 62 and the insulating layer 72 can serve as discharging paths through breakdown of the α-Si layer 62 and the insulating layer 72 so that ESD protection can be achieved.

In summary, the protecting structure for ESD of the invention provides at least the following advantages over the conventional techniques:

(1) Utilizing breakdown of α-Si layer of the present invention has much better discharging efficiency than the insulating layer of the conventional technique.

(2) The inducing discharging area such as dummy pixels, dummy data lines, and dummy scan lines are located outside the display area so that, even though ESD damage event occurs, influence upon the image display can be reduced to a minimum.

(3) The discharging capacitor can store a substantial amount of electrostatic charges, and breakdown of the insulator or the α-Si layer in the present invention do provide good help in ESD protection.

(4) While achieving the protection structure of the invention, prevention of ESD problem is also accomplished immediately.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A protecting structure for electrostatic discharge (ESD) formed on a substrate of a thin film transistor-liquid crystal display (TFT-LCD), wherein a display area of the substrate is formed by a pixel array consisting of a plurality of pixel units, a plurality of scan lines, and a plurality of data lines, wherein each gate of the thin film transistor in each said pixel unit is electrically connected to a corresponding row of said scan line, wherein each drain of the thin film transistor in each said pixel unit is electrically connected to a corresponding column of said data line, the protecting structure comprising:

a first rake metal, formed outside the display area, wherein each short end of said first rake metal aligns said data line, wherein a tip of each short end of said first rake metal and another tip of the corresponding said data line are both sharp in triangle shape so as to accumulate electrostatic charges;

an α-Si layer, formed exactly under one said predetermined short end of said first rake metal and the corresponding data line so as to provide a discharging path for performing through breakdown of said α-Si layer and thereby to eliminate electrostatic charges from the tip of said short end of the first rake metal and the tip of said corresponding data line;

a plurality of dummy pixel units formed outside the display area for inducing electrostatic discharging, wherein said each gate of said thin film transistors (TFTs) belongs to said dummy pixel units connected the corresponding row of said scan line, and wherein said each drain of said TFTs belongs to said dummy pixel units connected the corresponding column of said data line;

a second rake metal, formed outside the display area; and a discharging capacitor consisted of said second rake metal, said first rake metal, and an insulating layer, wherein a long end of said second rake metal and another long end of said first rake metal are both sharp in shape to accumulate electrostatic charges, wherein the electrostatic charges accumulated cause breakdown of the insulating layer to help discharging the electrostatic charges.

2. The protecting structure for ESD according to claim 1, wherein each said short end of said second rake metal aligns with said scan line, wherein the tip of each said short end of said second rake metal and the tip of the corresponding said scan line are both sharp in triangle shape so as to accumulate electrostatic charges.

3. A protecting structure for electrostatic discharge (ESD) formed on a substrate of a thin film transistor-liquid crystal display (TFT-LCD), wherein a display area of the substrate is formed by a pixel array consisting of a plurality of pixel units, a plurality of scan lines, and a plurality of data lines, wherein each gate of the thin film transistor in each said pixel unit is electrically connected to a corresponding row of said scan line, wherein each drain of the thin film transistor in each said pixel unit is electrically connected to a corresponding column of said data line, the protecting structure comprising:

a first rake metal, formed outside the display area, wherein each short end of said first rake metal aligns said data line, wherein a tip of each short end of said first rake metal and another tip of the corresponding said data line are both sharp in triangle shape so as to accumulate electrostatic charges;

an α-Si layer, formed exactly under one said predetermined short end of said first rake metal and the corresponding data line so as to provide a discharging path for performing through breakdown of said α-Si layer and thereby to eliminate electrostatic charges from the tip of said short end of the first rake metal and the tip of said corresponding data line;

a second rake metal formed outside the display area, wherein each said short end of said second rake metal aligns with said scan line, wherein the tip of each said short end of said second rake metal and the tip of the corresponding said scan line are both sharp in triangle shape so as to accumulate electrostatic charges; and a discharging capacitor consisted of said second rake metal, said first rake metal, and an insulating layer, wherein a long end of said second rake metal and another long end of said first rake metal are both sham in shape to accumulate electrostatic charges, wherein the electrostatic charges accumulated cause breakdown of the insulating layer to help discharging the electrostatic charges.

* * * * *